(12) United States Patent
Hashimoto

(10) Patent No.: US 6,885,356 B2
(45) Date of Patent: Apr. 26, 2005

(54) ACTIVE-MATRIX TYPE DISPLAY DEVICE

(75) Inventor: Yoshiharu Hashimoto, Tokyo (JP)

(73) Assignee: NEC Electronics Corporation, Kawasaki (JP)

(*) Notice: Subject to any disclaimer, the term of this patent is extended or adjusted under 35 U.S.C. 154(b) by 441 days.

(21) Appl. No.: 09/906,996

(22) Filed: Jul. 17, 2001

(65) Prior Publication Data

US 2003/0016200 A1 Jan. 23, 2003

(30) Foreign Application Priority Data

Jul. 18, 2000 (JP) ........................................ 2000-217907

(51) Int. Cl.⁷ ................................................. G09G 3/30
(52) U.S. Cl. .............................. 345/77; 345/55; 345/90; 345/204; 713/310; 713/320; 315/169.1; 315/169.3
(58) Field of Search ............................. 345/55, 82, 205, 345/206, 83, 44, 46, 78, 204, 91, 92, 72, 76, 36, 45, 211, 212, 214, 202; 315/169.1, 169.3, 169.4; 713/310, 320

(56) References Cited

U.S. PATENT DOCUMENTS

| | | | |
|---|---|---|---|
| 6,005,541 A | * | 12/1999 | Takahashi et al. ............. 345/87 |
| 6,169,532 B1 | * | 1/2001 | Sumi et al. .................... 345/98 |
| 6,518,962 B1 | * | 2/2003 | Kimura et al. .............. 345/211 |
| 6,633,270 B1 | * | 10/2003 | Hashimoto .................... 345/76 |

FOREIGN PATENT DOCUMENTS

| | | |
|---|---|---|
| JP | 2784615 | 4/1993 |
| JP | 11-231835 | 8/1999 |

OTHER PUBLICATIONS

"Organic El on the Rise, Focused on Mobile Applications" Nikkei Electronics, Mar. 13, 2000, No. 765, pp. 55–62.

* cited by examiner

*Primary Examiner*—Henry N. Tran
(74) *Attorney, Agent, or Firm*—Katten Muchin Zavis Rosenman

(57) ABSTRACT

A display device is provided which is capable of controlling luminance of a pixel by a bias voltage of a light emitting device making up the pixel to change a current that flows through the light emitting device.

EL (ElectroLuminescent) devices, TFTs, data lines, scanning lines, and variable bias lines are disposed in a matrix form. A bias voltage control circuit, in response to judging information fed from a judging circuit, outputs control information to a variable voltage generating circuit. The variable voltage generating circuit, in response to the control information, controls currents that are passed through the variable bias line to the EL device so that the EL device emits light at a value of the luminance corresponding to the fed current.

11 Claims, 4 Drawing Sheets

ACTIVE-MATRIX TYPE DISPLAY DEVICE

BACKGROUND OF THE INVENTION

1. Field of the Invention

The present invention relates to an active-matrix type display device having an active element and more particularly to the active-matrix type display device having a self-emissive type device such as an organic EL (Electro-Luminescent) device.

The present application claims priority of Japanese Patent Application No.2000-217907 filed on Jul. 18, 2000, which is hereby incorporated by reference.

2. Description of the Related Art

In recent years, portable information terminals have become widespread rapidly as typified by i-mode portable cellular phones (i-mode is a trademark of NTT DOCOMO company) and, as a display device for such the portable information terminals, a liquid crystal display is widely used.

When a back light is incorporated into the liquid crystal display, luminance on an entire screen is increased, thus presenting a problem in that the liquid crystal display consumes much power. To solve this problem, a display into which an organic EL device is incorporated as the display device suitably used for portable information terminals (hereinafter referred to as an organic EL display device) is disclosed in Nikkei Electronics (March 15 issue, No. 765, 2000, pages 55–62).

Main contents described in the above literature will be described below.

As the display device using an emissive-type display device which emits light when a current flows, a PDP (Plasma Display Panel) and/or the EL display device are known. The EL display device is classified into an inorganic EL display device and the organic EL display device and is further classified by its structure into a simple-matrix type EL device and an active-matrix type EL device.

FIG. 3 is a schematic conceptual block diagram showing configurations of the conventional simple-matrix type organic EL display device. As shown in FIG. 3, the conventional simple-matrix type organic EL display device includes an EL device 31, a capacitor 32 connected between an anode and a cathode of the EL device 31, a data line 33 connected to the anode and a scanning line 34 connected to the cathode, which are mounted in a matrix form.

The conventional simple-matrix type organic EL display device further has a data line driving circuit 35 and a scanning line driving circuit 36. The data line driving circuit 35 activates one of the data lines 33 and the scanning line driving circuit 36 activates one of the scanning lines 34, thus passing currents through the EL devices 31 each connecting to the data line 33 and scanning line 34 from the data line 33 to the scanning line 34 and causing the EL device 31 to emit light at a value of a luminance corresponding to a value of the current.

Though structure of the simple-matrix type organic EL display device is comparatively simple and its manufacturing costs can be reduced, it is difficult to increase the number of pixels and difficult to achieve a high definition display device. In the simple-matrix type organic EL display device, since the scanning lines 34 are selected one by one to cause the pixels to emit light, emissive time of each of the pixels is 1/the number of scanning lines in one frame period. To maintain the luminance at a specified level within limited time, it is necessary to instantly pass a large electric current through each of the pixels, which presents basic problems in that the luminance becomes low as accumulated emissive time is lengthened and a life of emissive material is shortened due to flowing of such the large electric current as the driving current through the simple-matrix type organic EL display device.

Next, operations and configurations of the conventional active-matrix type organic EL display device will be described by referring to FIG. 4. The conventional active-matrix type organic EL display device includes an EL device 41, a TFT (Thin Film Transistor) 42 connected between an anode of the EL device 41 and a bias line 47, a TFT 43 connected between a gate of the TFT 42 and a data line 45, and a capacitor connected between a gate of the TFT 42, and the bias line 47, which are arranged in a matrix form.

The conventional active-matrix type organic EL display device further has a data line driving circuit 48 and a scanning line driving circuit 49, and bias voltage source 410. When a scanning line 46 is activated by the scanning line driving circuit 49, a TFT 43 connected to the activated scanning line 46 is brought into conduction and a current flows through a data line 45 and through the TFT 43 from the data line driving circuit 48 to a capacitor 44, causing the capacitor 44 to be charged.

When a gate voltage of the TFT 42 becomes higher than a threshold voltage, the TFT 42 becomes conducting, causing currents to be fed through the bias line 47 from a bias voltage source 410 to the El device 41 and causing the EL device 41 to emit light at a value of the luminance corresponding to a value of the current.

As is apparent from the above description, unlike in a case of the simple-matrix type organic EL display device, the active-matrix type organic EL display device has a characteristic that, even if the number of the scanning line is increased, same emissive time as frame period can be secured.

In the comparison of the active-matrix type liquid crystal display device with the active-matrix type organic EL display device, though transmittance (that is, it is equivalent to luminance of the active-matrix type organic EL display device) of the active-matrix type liquid crystal display device is proportional to a voltage applied to the liquid crystal, the luminance of the active-matrix type organic EL display device is proportional to a current and the voltage output from the bias voltage source 410 to the bias line 47 is maintained at a specified level.

Since the organic EL display device is a current-driven type display device, the TFT adapted to simply perform ON/OFF operations such as those used in the active-matrix type liquid crystal display device cannot be used and the TFT having on-resistance being small enough to pass sufficient currents is required.

Such the TFT is difficult to produce using technology to manufacture a general amorphous silicon TFT. To manufacture such the TFT, it is necessary to use a process of manufacturing low-temperature polysilicon TFT being used in some kind of a high definition display device.

If the low-temperature polysilicon TFT is used, it is possible to form the TFT and/or driving circuits on a glass substrate and, when multi-gray shades are generally displayed, almost all circuits on a scanning line side and partial circuits (selection switches) on a data line side are formed on the glass substrate and complicated circuits used to control gray shade displaying are implemented by semiconductor circuits formed on a single crystal substrate.

To achieve full color displaying, in the active-matrix type liquid crystal display device, red, green, and blue color filters are used. In the active-matrix type organic EL display device, the full color displaying is implemented by mounting organic EL devices each emitting light in red, green, or blue. However, this method presents problems in that a life of the organic EL emitting light in red is shorter than that of other organic EL emitting light in other colors and in that the color of the emitted light is not purely red but is nearly orange. Moreover, there is available another method in which the red color, green color, and blue color are mixed to produce white color and pixels each corresponding to each of the red, green, and blue colors are formed by using color filter as in a case of the liquid crystal display device.

However, in the above active-matrix organic EL display device, though the luminance can be controlled by the currents that are passed through the organic EL devices making up each of the pixels, since materials of the organic EL devices each emitting light in red, green, or blue are different, it is difficult to control production processes so that the luminance and life of each of the pixels are made equal.

Furthermore, when such the organic EL device is employed as the display device of portable cellular phones, reduction in power consumption in particular is required. However, in the conventional active-matrix type organic EL display device, time during which displayed contents are not changed exceeds a specified period of time, it is impossible to decrease the luminance for each of pixels, lines or frames, or to lower the luminance for the pixels, the lines or the frames making up an image requiring no more luminous display, thus making it difficult to greatly lower the power consumption.

SUMMARY OF THE INVENTION

In view of the above, it is an object of the present invention to provide an active-matrix type display device capable of most suitably correcting for color balance at all times even when a light emitting device is degraded by controlling a bias voltage of the light emitting device making up a pixel and by changing a current flowing through the light emitting device and by causing emissive efficiency of the light emitting device to be lowered with increase of accumulated light emissive time.

It is another object of the present invention to provide the active-matrix type display device capable of greatly reducing power consumption by decreasing luminance, when time during which displayed contents are not changed exceeds a specified period of time, for each pixel, each line, or each frame and/or by lowering the luminance for a pixel, a line, or a frame making up an image requiring no more luminous display.

It is still another object of the present invention to provide the active-matrix type display device capable of enhancing the luminance of an image to be highlighted for each line or each frame and of easily identifying the image that should be highlighted.

According to a first aspect of the present invention, there is provided an active-matrix type display device including:
light emitting devices;
scanning lines:
data lines;
transistors;
switches;
a variable bias voltage generating circuit used to generate a variable bias voltage; and wherein one end of each of said light emitting devices is connected to a source (or a drain) of a corresponding transistor and the drain (or the source) of the transistor is connected to an output terminal of the variable bias voltage generating circuit and a gate of the transistor is connected to a corresponding data line through a corresponding switch; and wherein the switch is brought into conduction by activating a corresponding scanning line and an image signal is fed through the data line and the switch to the gate of the transistor and the variable bias voltage generating circuit controls the variable bias voltage so that a current flowing through each light emitting device in response to control information becomes a specified value.

In the foregoing, a preferable mode is one wherein a capacitor is connected between the gate of the transistor and either of the source or the drain of the transistor not being connected to the light emitting device.

Also, a preferable mode is one wherein the light emitting device is an EL (Electro-Luminescent) device.

Also, a preferable mode is one wherein, when the image signal is not input through the data line for a specified period of time or more, the variable bias voltage generating circuit is controlled so that an output voltage is decreased.

Also, a preferable mode is one wherein, when importance of the image signal input through the data line is judged to be low, the variable bias voltage generating circuit is controlled so that the output voltage is decreased.

According to a second aspect of the present invention, there is provided an active-matrix type display device including:

a variable bias voltage generating circuit;

light emitting devices, scanning lines, data lines, transistors, and switches, which are arranged in a matrix form; and wherein one end of each light emitting device is connected to a source (or a drain) of the transistor and either of the drain or (the drain) of the transistor being mounted on a first column to Nth (N is an integer being two or more) column is connected to any one of a first output terminal to an Nth output terminal of the variable bias voltage generating circuit and a gate of the transistor is connected through a corresponding switch to a corresponding data line; and wherein the switch is brought into conduction when a corresponding scanning line is activated and an image signal is fed through the data line and the switch to the gate of the transistor and the variable bias voltage generating circuit independently controls each of variable bias voltages output from the first output terminal to the Nth output terminal of the variable bias generating circuit so that a current flowing through each light emitting device mounted on each of the columns in response to control information becomes a specified value.

In the foregoing, a preferable mode is one wherein a value of the N is set to 3 and the light emitting device emitting a first color is disposed in a first column group made up of 3 m (m=0, 1, 2, . . . )+1 columns, the light emitting device emitting a second color is disposed in a second column group made up of 3 m+2 columns and the light emitting device emitting a third color is disposed in a third column group made up of 3 (m+1) columns.

With the above configuration, the time during which displayed contents are not changed exceeds the specified time, the luminance is decreased for each of the pixels, each of the lines or each of the frames and also the luminance is made low in the pixel, line or frame for which bright displaying is not required and therefore the power consumption can be greatly reduced.

With another configuration, the current that flows through the EL device making up the pixel of the image having less importance is made small and therefore the power consumption can be also lowered greatly.

With still another configuration, the current that flows through the EL device in response to highlighting information is controlled so as to enhance the luminance of the image that should be highlighted and therefore it is made easy to identify the image that should be highlighted.

With still another configuration, the current that flows through the light emitting device is changed by controlling the bias voltage of the light emitting device making up the pixel and therefore, even if emissive efficiency of the light emitting device is decreased with increase in the accumulated emissive time and even if the light emitting device is degraded, it is possible to make a most optimum correction for color balance.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
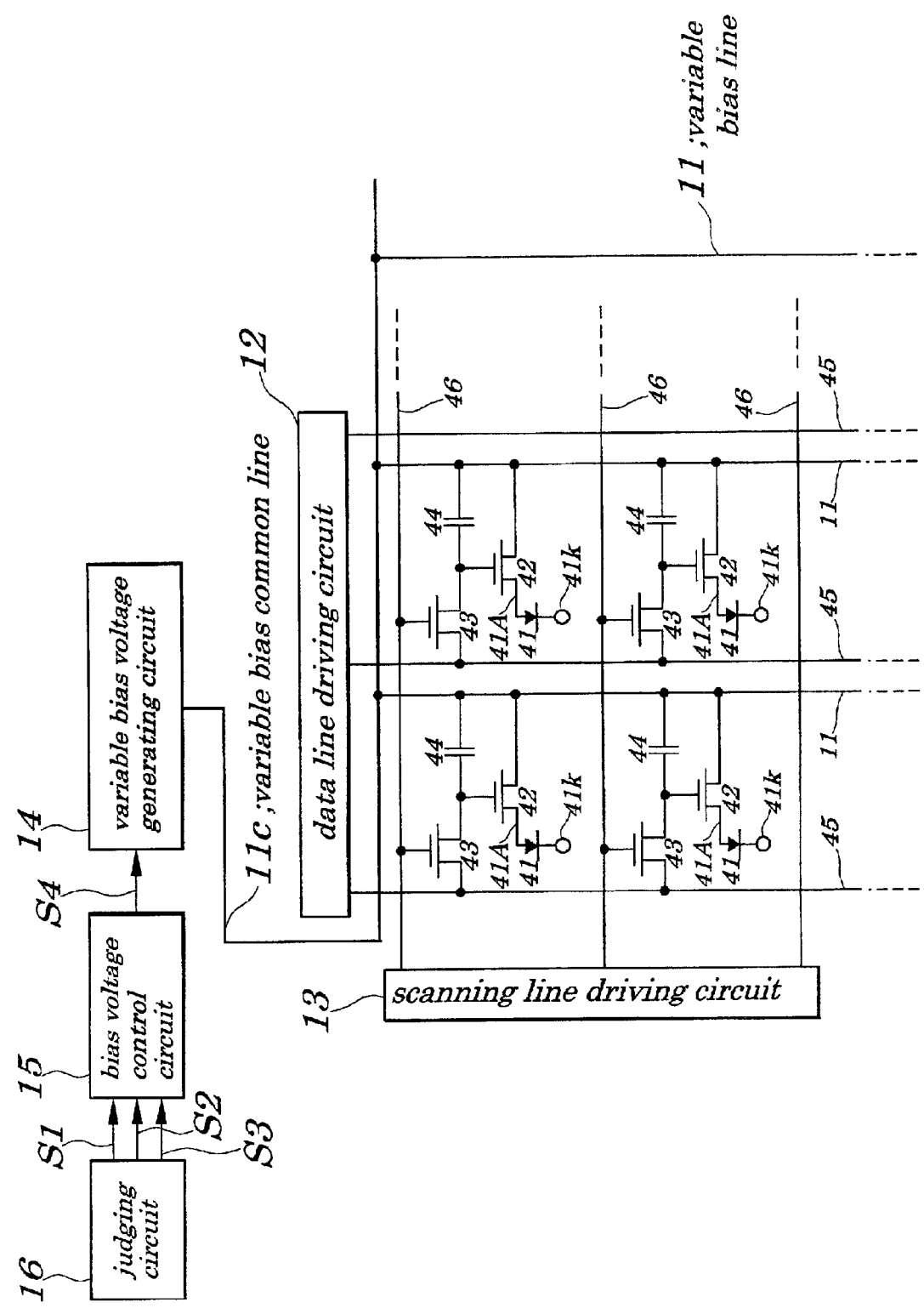
FIG. 1 is a schematic block diagram of a display device according to a first embodiment of the present invention.
Figure 4:
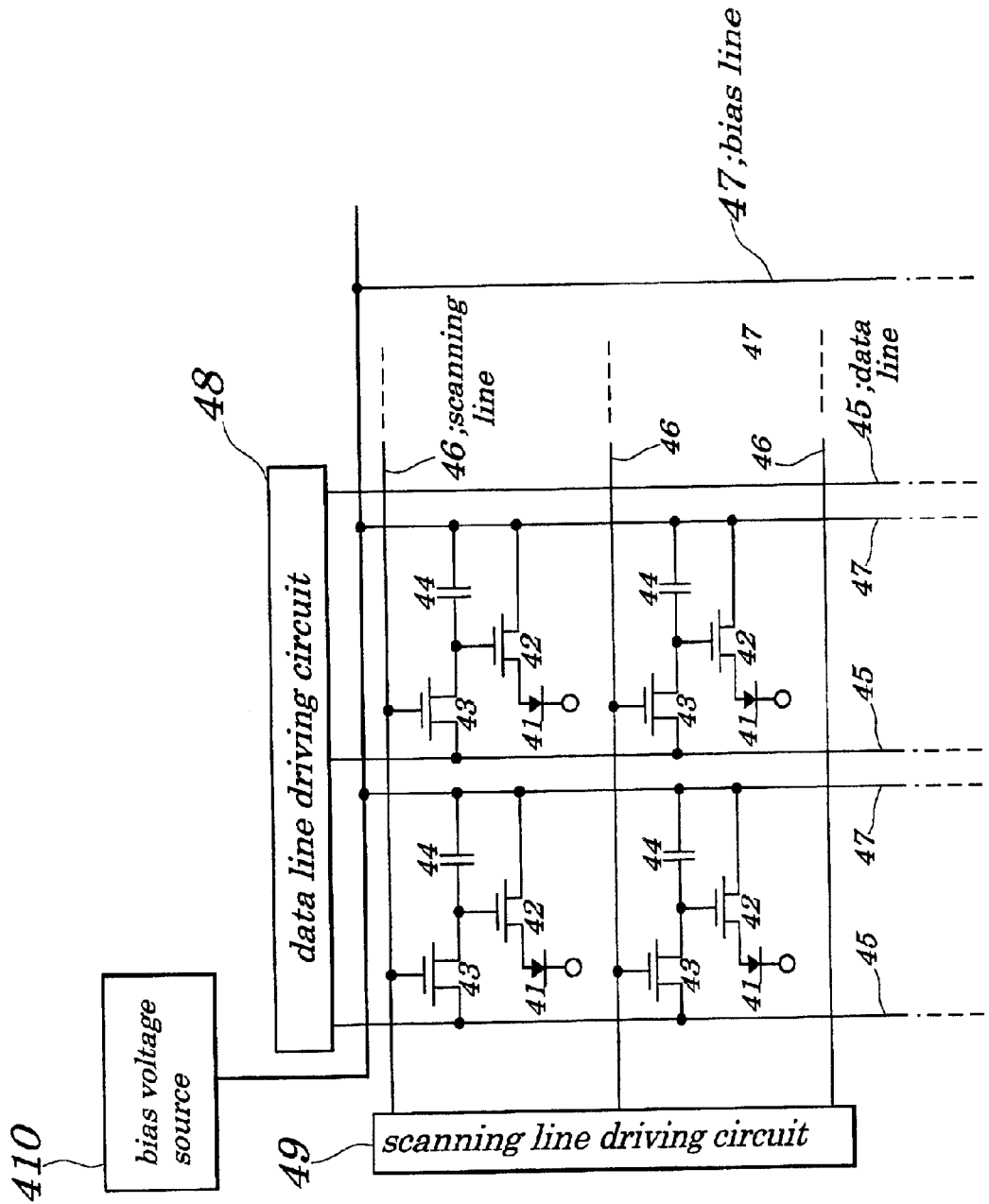
FIG. 4 is a schematic block diagram showing configurations of a conventional active-matrix type EL display device.

FIG. 1 is a schematic block diagram of a display device according to a first embodiment of the present invention. In FIG. 1, same reference numbers as those in FIG. 4 are assigned to corresponding parts having the same functions as those in FIG. 4. The display device of the embodiment shown in FIG. 1 includes an EL device 41 having an anode 41A and a cathode 41K biased so as to be at a specified voltage, a TFT 42 connected between the anode of the EL device 41 and a variable bias line 11, a TFT 43 connected between a gate of the TFT 42 and a data line 45 and operated as a switch, and a capacitor 44 connected between the gate of the TFT 42 and the variable bias line 11, which are arranged in a matrix form.

The display device of the embodiment is provided with a data line driving circuit 12 used to drive the data line 45, a scanning line driving circuit 13 used to drive a scanning line 46, and a variable bias voltage generating circuit 14 used to drive the variable bias line 11.

A variable bias common line 11c which is used as a common line to the variable bias lines 11 is connected to one output terminal of a variable bias voltage generating circuit 14, Furthermore, the display device of the embodiment has a bias voltage control circuit 15 used to output control information S4 to the variable bias voltage generating circuit 14 in response to low power consumption mode information S1 output from judging circuit 16 (treated later), importance judging information S2, and highlighting information S3.

When the scanning line 46 is activated by the scanning line driving circuit 13, the TFT 43 being connected to the activated scanning line 46 is brought into conduction, causing a current to flow from the data line driving circuit 12 through the TFT 43 to the capacitor 44 and the capacitor 44 to be charged.

On the other hand, when the scanning line 46 is inactivated by the scanning line driving circuit 13, the TFT 43 being connected to the inactivated scanning line 46 is brought into non-conduction and electric charge accumulated in the capacitor 44 is held and a terminal voltage of the capacitor 44 being connected to the gate of the TFT 42 becomes constant. Then, the gate of the TFT 42 is biased by the terminal voltage and, when the gate voltage of the TFT 42 becomes higher than the threshold value, the TFT 42 is brought into conduction, causing a current to be fed from the variable bias voltage generating circuit 14 to the EL device 41 through the variable bias line 11 and causing the EL device 41 to emit light at a value of the luminance corresponding to a value of the current.

A current Ie1 that flows into the EL device 41 is determined by the gate voltage of the TFT 42 and a voltage between the source and drain of the TFT 42. If multi-gray shades in displaying are implemented by changing a width of a pulse applied to the gate of the TFT using technologies disclosed in Patent Gazette No. 2784615 or Japanese Patent Application Laid-open No. Hei 11-231835, the voltage between the source and drain of the TFT 42 is 0.1 V to 0.2 V and a voltage of the anode 41A of the EL device 41 is a value obtained by subtracting the voltage (0.1 V to 0.2 V) between the source and drain of the TFT 42 from a voltage Vb output from the variable bias voltage generating circuit 14. Therefore, if the gray shade is controlled by a pulse width modulating method, the current Ie1 is controlled by the voltage Vb output from the variable bias voltage generating circuit 14.

In other words, in the display device of the present invention using the pulse width modulating method, the gray shade corresponding to image signals input through the data line 45 is controlled by a width of the pulse applied to the gate of the TFT 42 and the luminance serving as a reference of the gray shade is controlled by the voltage Vb output from the variable bias voltage generating circuit 14.

It is required in portable cellular phones in particular to consume less power. In some portable cellular phones being equipped with the liquid crystal display device, a back light comes on when an input button is pressed. That is, when operations of the portable cellular phone are performed while viewing the liquid crystal display device, the back light is lit bright and, if a state of no operations continues for a while, the back light goes OFF. In a transmissive-type liquid crystal display device, the liquid crystal display can be seen in a bright place even if the back light goes OFF, however, in a dark place, the liquid crystal display cannot be seen unless the back light is ON. In the liquid crystal display device being equipped with the back light, to see a screen of the display device in a dark place, the back light automatically comes on only if the input button is pushed, thus presenting no special problems.

In the portable cellular phone being equipped with the display device of the present invention, though a time or clock being minimum necessary information or an antenna mark indicating a signal receiving state are being displayed all the time on the screen of the display device, while operations of the portable cellular phone are not performed, less currents Ie1 are fed to pixels of the EL device 41 making up the screen on which such the time, clock, antenna mark or the like are not displayed to the power consumption.

As is apparent from the above description, in the liquid crystal display device, reduction in power consumption is achieved by turning ON and OFF the back light to calibrate the luminance of the entire screen, however, in the display device of the present invention, the power consumption can be reduced more, when compared with the case of the liquid crystal display device, by controlling currents flowing through the El device 41 for each of the EL devices 41 making up the pixel, for each of the lines and frames making up the screen in order to pass the current that can respond to the required luminance, that is, to an amount of light to be emitted.

Next, operations of the display device of the present invention will be described by referring to FIG. 1.

A judging circuit 16 is adapted to calculate time that has elapsed since the input button (not shown) had been pushed and, if the time elapsed following the pushing of the input button exceeds set time, the low power consumption mode information S1 is output to the bias voltage control circuit 15.

The bias voltage control circuit 15, when receiving the low power consumption mode information S1, decreases the voltage Vb output from the variable bias voltage generating circuit 14 and makes smaller the current Ie1 that flows through the EL device 41.

This calibrates, when the time elapsed following the pushing of the input button becomes longer than the set time, the luminance for each of the pixels is calibrated and control is made so as to decrease the luminance of the pixel for which bright displaying is not required.

Since a static image such as wallpaper on the screen is not of essential importance, it is not necessary to enhance the luminance of the pixels making up the static image.

That is, in FIG. 1, the judging circuit 16 receives one screen of image data and judges importance of the image data for each of the pixels. It outputs importance judging information S2 being a result of a judgment to the bias voltage control circuit 15.

For example, the image data making up a ground image is judged to be of less importance and the importance judging information S2 informing less importance is output from the judging circuit 16.

The bias voltage control circuit 15, when receiving the importance judging information S2, decreases the voltage Vb output from the variable bias voltage generating circuit 14 and makes smaller the current Ie1 that flows through the EL device 41. Thus, the luminance for each of the pixels can be calibrated by controlling the current Ie1 that flows through the EL device in response to the importance judging information S2.

Therefore, since the current that flows through the EL device 41 making up the image having less importance is made small, power consumption in the display device of the present invention can be greatly lowered.

In the above example, the method for lowering the power consumption by decreasing the luminance of the image data having low priority in displaying is described. In contrast, in the case of the image having high priority in displaying such as images informing emergency information, the display can be highlighted by enhancing the luminance of the image data making up the image with high priority. That is, the bias voltage control circuit 15, when receiving highlighting information S3 from the judging circuit 16, boosts the voltage Vb output from the variable bias voltage generating circuit 14 and increases the current Ie1 that flows through the EL device 41. Thus, the luminance of the image that should be highlighted is enhanced for each of the pixels, each of the lines making up the image or each of the frames by controlling the current Ie1 that flows through the EL device 41 based on the highlighting information S3, enabling the image to be identified as the highlighted image.

Second Embodiment

Figure 2:
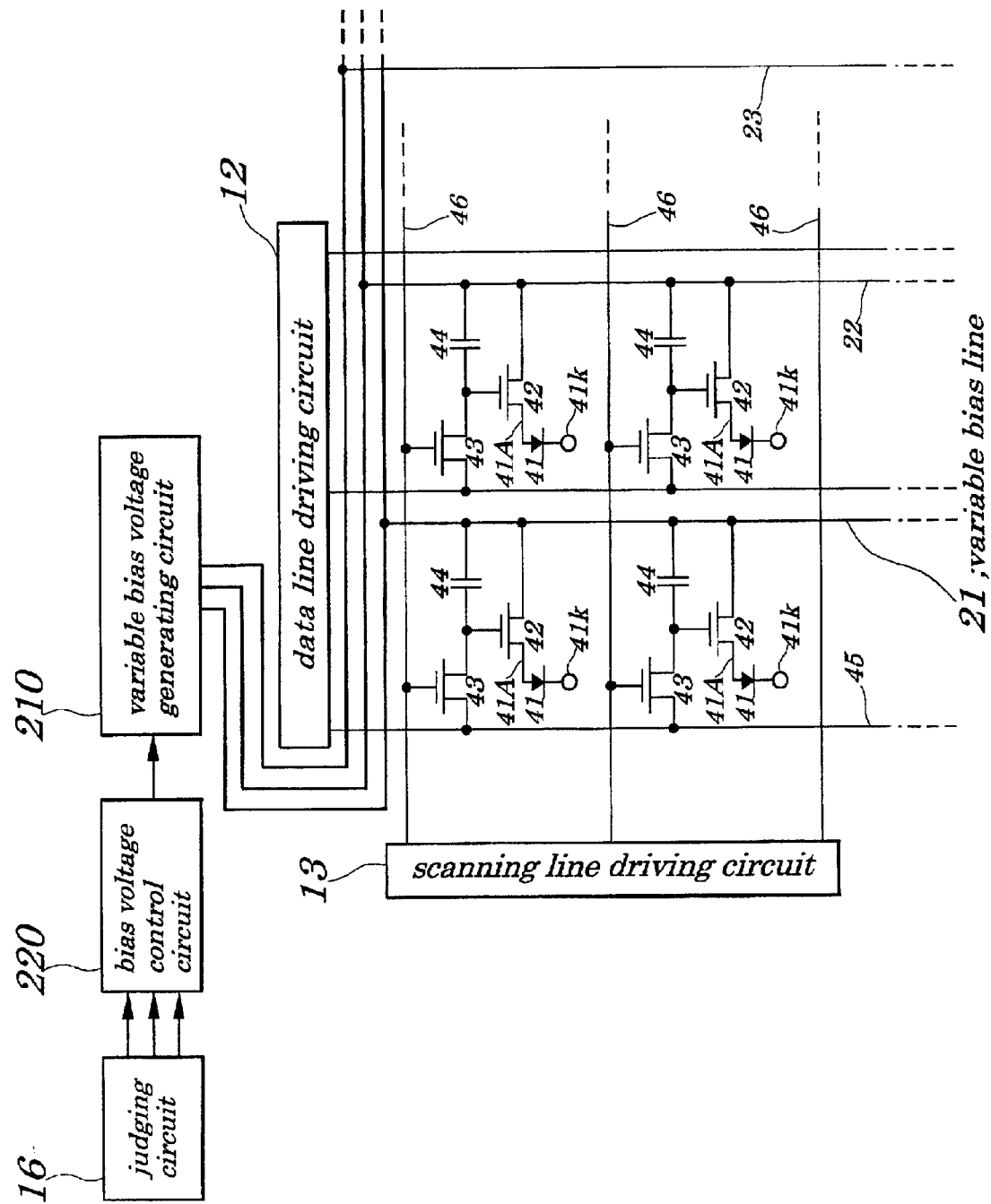
FIG. 2 is a schematic block diagram of a display device according to a second embodiment of the present invention.
Figure 3:
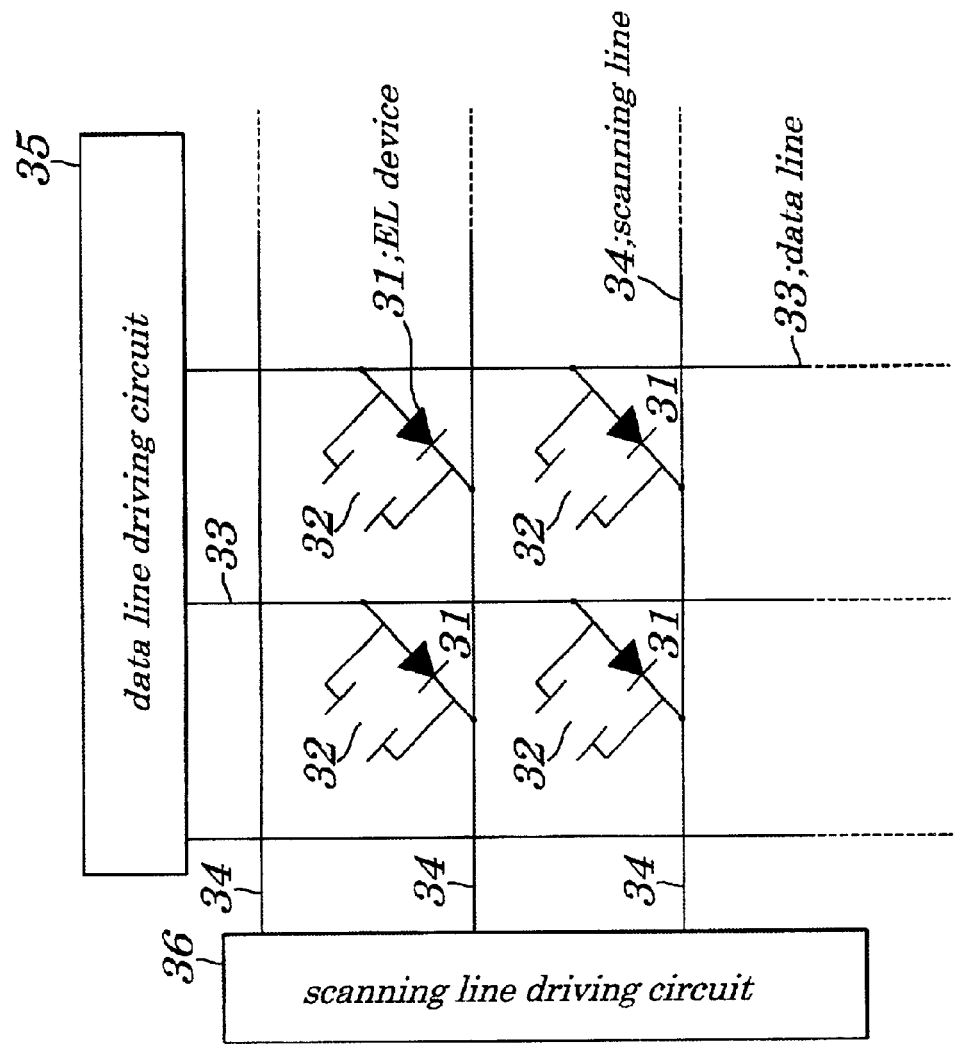
FIG. 3 is a schematic block diagram showing configurations of a conventional simple-matrix type EL display device.

FIG. 2 is a schematic block diagram of a display device according to a second embodiment of the present invention. In FIG. 2, same reference numbers as those in FIG. 1 are assigned to corresponding parts having the same functions as those in FIG. 1. In FIG. 1, a variable bias common line 11c which is used as a common line to the variable bias lines 11 making up the display device is connected to one output terminal of a variable bias voltage generating circuit 14, however, in FIG. 2, each of a plurality of variable bias lines 21, 22, 23 to 2N making up the display device is connected to each of different output terminals of variable bias voltage generating circuit 210.

By configuring as above, currents that flow through an EL device 41 can be simultaneously and independently controlled for one column of the EL devices 41 and, as a result, luminance of one column of the EL devices 41 can be calibrated simultaneously and independently.

For example, when the display device is configured so that the EL device 41 emitting light in red (R) is disposed in the leftmost column, the EL device 41 emitting light in green (G) is disposed adjacent to the EL device 41 (R) on the right side and the EL device 41 emitting light in blue (B) is disposed adjacent to the EL device 41 (G) further on the right side and that these columns of the EL devices 41 are repeatedly mounted in the same manner as above, even if emissive efficiency of the EL device 41 emitting light in red, green, or blue is made lower with increase in accumulated emissive time and even if the El devices 41 are degraded, the luminance of the EL devices 41 emitting light in red, green, or blue can be independently controlled, thus enabling most optimum correction to be made for color balance.

As described above, by controlling voltage Vb output from the variable bias voltage generating circuit 14, luminance can be calibrated for each of pixels, however, it can be controlled for each of lines or frames. In this case, the luminance can be calibrated for each of the lines or frames by controlling the voltage Vb output from the variable bias voltage generating circuit 14 for each of the lines or each of the frames.

It is apparent that the present invention is not limited to the above embodiments but may be changed and modified without departing from the scope and spirit of the invention. For example, in the above embodiments, each of the judging circuit, variable bias voltage generating circuit, and bias voltage control circuit is mounted to be operated independently, however, these circuits may be incorporated into one circuit block and also only the variable bias voltage generating circuit and bias voltage control circuit maybe incorporated into one circuit block. That is, these circuits may be combined in various ways. Moreover, functions of the variable bias voltage generating circuit 14 and bias voltage control circuit may be implemented by using programs or they may be configured so as to take out results of operations of these circuits as voltages using a D/A (Digital to Analog) converter.

In the above embodiments, the EL device is used as the light emitting device, however, light emitting devices other than the EL device may be employed in the display device of the present invention.

Furthermore, in FIG. 2, either of the source or the drain of the TFT 42 mounted on the same column is connected to the common variable bias line 21, however, the method of connecting the TFT to the variable bias line 21 may be changed, that is, either of the source or the drain of the TFT 42 mounted on the same row may be connected to the common variable bias line 21.

What is claimed is:

1. An active matrix-type display device comprising:
   a plurality of scanning lines;
   a plurality of data lines each crossing said plurality of said scanning lines;
   a plurality of light emitting elements;
   a plurality of switches;
   a plurality of transistors;
   a bias voltage line;
   each of said transistors being connected between an associated one of said light emitting elements and said bias voltage line, each of said switches being connected between an associated one of said data lines and a gate of an associated one of said transistors and being rendered one of ON and OFF states by an associated one of said scanning lines;
   a driving unit driving said scanning and data lines to display an image; and
   a variable bias voltage generating circuit electrically connected to said bias voltage line; said variable bias voltage generating circuit responding to a first control signal which represents that a content of said image is not changed for a predetermined period of time and changing a bias voltage on said bias voltage line such that luminance of said light emitting elements is lower than the luminance of said light emitting elements during said predetermined period of time.

2. The device as claimed in claim 1, wherein said first control signal is produced when no key operation is made during said predetermined period of time.

3. The device as claimed in claim 1, wherein said variable bias voltage generating circuit further responds to a second control signal that takes a first state when said driving unit drives said scanning and data lines in response to first information and a second state when said driving unit drives said scanning and data lines in response to second information, said variable bias voltage generating circuit changing the bias voltage of said bias voltage line such that the luminescence of said light emitting elements in said first state of said second control signal is lower than the luminescence of said light emitting elements in said second state of said second control signal.

4. The device as claimed in claim 3, wherein said second control signal takes said first state when said first information is a static image such as wallpaper on a screen.

5. The device as claimed in claim 1, wherein said variable bias voltage generating circuit further responds to a third control signal that takes a first state when said driving unit drives said scanning and data lines in response to third information and a second state when said driving unit drives said scanning and data lines in response to fourth information, said variable bias voltage generating circuit changing the bias voltage of said bias voltage line such that the luminescence of said light emitting elements in said first state of said third control signal is higher than the luminescence of said light emitting elements in said second state of said third control signal.

6. The device as claimed in claim 5, wherein said third control signal takes said second state when said third information is to be highlighted.

7. An active matrix-type display device comprising:
   a plurality of scanning lines;
   a plurality of data lines each crossing said scanning lines;
   a plurality of light emitting elements;
   a plurality of switches;
   a plurality of transistors;
   a bias voltage line;
   each of said transistors being connected between an associated one of said light emitting elements and said bias voltage line, each of said switches being connected between an associated one of said data lines and a gate of an associated one of said transistors and being rendered one of ON and OFF states by an associated one of said scanning lines;
   a driving unit driving said scanning and data lines to display an image; and
   a variable bias voltage generating circuit electrically connected to said bias voltage line; said variable bias voltage generating circuit responding to a control signal that takes a first state when said driving unit drives said scanning and data lines in response to first information and a second state when said driving unit drives said scanning and data lines in response to second information, said variable bias voltage generating circuit changing the bias voltage of said bias voltage line such that the luminescence of said light emitting elements in said first state of said control signal is different from the luminescence of said light emitting elements in said second state of said control signal.

8. The device as claimed in claim 7, wherein said variable bias voltage generating circuit changes the bias voltage of said bias voltage line such that the luminescence of said light emitting elements in said first state of said control signal is lower than the luminescence of said light emitting elements in said second state of said control signal, and said control signal takes said first state when said first information is a static image such as wallpaper on a screen.

9. The device as claimed in claim 8, wherein said variable bias voltage generating circuit changes the bias voltage of said bias voltage line such that the luminescence of said light emitting elements in said first state of said control signal is higher than the luminescence of said light emitting elements in said second state of said control signal, and said control signal takes said first state when said first information is to be highlighted.

10. An active matrix-type display device comprising:
    a plurality of scanning lines;
    first, second and third groups of data lines each crossing said plurality of said scanning lines;
    first, second and third groups of light emitting elements which are provided respectively for first, second and third colors;
    first, second and third groups of switches;
    first, second and third groups of transistors;
    first, second and third bias voltage lines supplied respectively with first, second and third bias voltages;

each of said first group of transistors being connected between an associated one of said first group of light emitting elements and said first bias voltage line, each of said first group of switches being connected between an associated one of said first group of data lines and a gate of an associated one of said first group of transistors and being rendered one of ON and OFF states by an associated one of said scanning lines;

each of said second group of transistors being connected between an associated one of said second group of light emitting elements and said second bias voltage line, each of said second group of switches being connected between an associated one of said second group of data lines and a gate of an associated one of said second group of transistors and being rendered one of ON and OFF states by an associated one of said scanning lines, each of said third group of transistors being connected between an associated one of said third group of light emitting elements and said third bias voltage line, each of said third group of switches being connected between an associated one of said third group of data lines and a gate of an associated one of said third group of transistors and being rendered one of ON and OFF states by an associated one of said scanning lines;

a driving unit driving said scanning lines and said first, second and third groups of data lines to display an image; and a variable bias voltage generating circuit electrically connected to said first, second and third bias voltage lines and controlling first, second and third bias voltages such that a good color balance among said first, second and third colors emitted respectively from said first, second and third groups of light emitting elements is attained.

11. The device as claimed in claim 10, wherein a variable bias voltage generating circuit further controls, when a content of said image is not changed for a predetermined period of time, said first, second and third bias voltages such that luminance of said first, second and third groups of light emitting elements is lower than the luminance of said first, second and third groups of light emitting elements during said predetermined period of time.

* * * * *